United States Patent [19]
Lecomte et al.

[11] Patent Number: 5,479,346
[45] Date of Patent: Dec. 26, 1995

[54] PROCESS AND DEVICE FOR DETECTING THE CURRENT PHASE OF OPERATION OF A SYSTEM WITH MULTIPLE PHASES OF OPERATION

[75] Inventors: Pierre Lecomte, Aureville; Laurent Coquin, Toulouse, both of France

[73] Assignees: Aerospatiale Societe Nationale Industrielle, Paris; Aerospatiale Protection Systemes Apsys, Mantes-La-Jolie, both of France

[21] Appl. No.: 242,979

[22] Filed: May 16, 1994

[30] Foreign Application Priority Data

May 14, 1993 [FR] France .................................. 93 05851

[51] Int. Cl.$^6$ ............................ G01C 23/00; G06F 15/00
[52] U.S. Cl. ................... 364/424.06; 364/433; 364/434; 340/973
[58] Field of Search .................................. 364/433, 140, 364/141, 551.01, 550, 505, 506, 424.06, 434; 340/964, 973, 524, 525

[56] References Cited

U.S. PATENT DOCUMENTS 4,803,854 2/1989 Kikuchi et al. ........................ 68/12 R
4,987,413 1/1991 Grove ...................................... 340/970
5,208,590 5/1993 Pitts ......................................... 340/973

Primary Examiner—Michael Zanelli
Attorney, Agent, or Firm—Fisher, Christen & Sabol

[57] ABSTRACT

A process and device for detecting the current phase of operation of a system with multiple phases of operation. According to the invention, the operation is partitioned into a set of phases (I to X) from which is chosen a reference phase (I). The set of possible switches to the other phases is determined for each phase. And, a set of parameters is defined for each of the switches, the set of parameters being characteristic of the switch. The sets of parameters are continuously detected. The chain of switches actually involved is determined on the basis of the reference phase (I) with the aid of variations in the parameters, and the current phase of operation is deduced from the chain of switches. Although the invention is applicable to numerous systems, one such system to which it is applicable is the operation of a transport airplane.

6 Claims, 2 Drawing Sheets

PROCESS AND DEVICE FOR DETECTING THE CURRENT PHASE OF OPERATION OF A SYSTEM WITH MULTIPLE PHASES OF OPERATION

BACKGROUND OF THE INVENTION

1. Field of the Invention

The present invention relates to a process and a device for detecting the current phase of operation of a system with multiple phases of operation. A "system with multiple phases of operation" is understood to mean, in the context of the present invention, any complex system such as for example a railway, a nuclear power station, a helicopter, an airplane, etc., the operation of which is controlled by one or more operators and is ordinarily broken down into characteristic steps such as, for example, checks before powering-up, checks after powering-up, start-up, low-speed operation before throttling-up the power, the first phase of throttling-up the power, etc., the switching from one step to the next being conditioned by the obtaining of certain performance indices or the achieving of certain objectives (stabilization of an electrical voltage, crossing of a speed threshold, etc.).

Although the present invention is thus applicable to numerous systems, it will be described below more particularly in the context of an airplane, more particularly a transport airplane, the operation of which is controlled by a crew.

2. Broad Description of the Invention

It is known that the "operation" of a transport airplane can be broken down into various phases, such as for example stopped on the ground, take-off, climb, cruising flight, descent, landing, etc.

With each of these phases there are associated operating domains sanctioned by the constructor or recommended as a function of the conditions of utilization and, consequently, the boundaries of these domains, the diverse technical and operational instructions, operations or controls, etc.

The technical and operational documentation (flight manual, operations manual, etc.) for a specified airplane takes account of this. The same is true for the procedures or associated checks, taking the form in particular of "check lists".

The flight crew is, of course, aware of the flight phase which the airplane is in. However, experience has shown abundantly that the crew is liable to make errors of various kinds. When wishing, therefore, either to assist the crew by presenting appropriate information, or to carry out a certain number of controls or checks affecting safety, operational efficiency, etc., during the flight, it is very useful, or even indispensable, to identify the present flight phase.

It is not desirable to ask the crew to provide this information; this would be an unacceptable overburden and another source of error. This identification must therefore be, on the one hand, automatic and, on the other hand, efficient in the presence of the majority of plausible crew errors.

The object of the present invention is therefore to detect, independently of the operators controlling the operation of a system, the current phase of operation of the said system. More particularly, in the application of the invention to an airplane, this object is the production of an airborne device, that is to say one capable of being installed on board and of operating there, with response times which are compatible with the usage made thereof, which is able to detect the present operational phase automatically, and to do so even in the presence of the greatest possible number of crew errors regarded as practically possible.

It will be noted that phase detection algorithms currently used on board airplanes are already known. However, these known algorithms use criteria which mix together indiscriminately measurements corresponding to the state parameters of the airplane (altitude, speed, engine thrust, etc.) and reports of actions by the crew presumed to correspond to a flight phase (lowering of the landing gear, lowering of the slats and flaps, choice of the mode of operation of the automatic pilot, etc.).

Thus, these known algorithms involve, in the detection of the flight phase, direct actions by crews susceptible to errors of handling or incorrect representation of the actual situation of the airplane. Moreover, the currently existing algorithms are matched to the specific need of the function of the computer in which they are installed.

The object of the present invention is therefore to alleviate the disadvantages of these known algorithms by delivering an independent item of information regarding the crew's conception of the actual situation of the airplane, including the flight phase.

To this end, according to the invention, the process for detecting the current phase of operation of a system with multiple phases of operation, is notable in that:

the said operation is partitioned into a set of phases, so that each phase corresponds to a partial domain of the operation of the said system, and so that the said set of phases covers the whole of the said operation;

a reference phase is chosen from the said phases of the said set;

for each of the said phases, the set of possible switches to the other phases is determined;

for each of the said switches, a set of parameters characteristic of the said switch is defined;

the said sets of parameters are detected continuously;

with the aid of the variations in the said parameters, the chain of switches actually involved is determined on the basis of the said reference phase; and the said current phase of operation is deduced from the said chain of switches.

Thus, contrary to the known prior technique described above with its disadvantages, according to the invention the current phase of operation is determined not through the state of a certain number of parameters specific to the said phase, but through the variation in parameters on transferring (or switching) from one phase to another.

By virtue of the invention, the current phase of operation is therefore determined with the aid of a reference phase and switches of phases involved between the said reference phase and the said current phase.

In the case of an airplane, the said reference phase is preferably chosen as being the stopped on the ground phase. Indeed, on the ground, when powering-up or when starting the first engine, the airplane is in a phase of operation which is known with certainty. It may either remain thus, or depart therefrom, and the only other phase which it may enter is that of travelling over the ground, subject to a switch of phase. The latter, in its turn, can give way to nothing other than a return to stopped on the ground or to the take-off run. Hence, gradually, from among the physically possible switches, the one which has—or has not—taken place is determined.

Moreover, it is known that very many parameters are measured permanently on airplanes; some are presented to the crew, others are not but constitute information necessary for the correct operation of the various systems of the airplane. The monitoring of some of these parameters and the execution of associated logic tests make it possible (trial flights and very special technical flights excluded) to determine that a switch of phase has taken place.

In order to guard against possible errors by the crew, several logic tests are preferably undertaken which appeal to different parameters or sequences of parameters and are carried out in parallel. A switch is preferably detected only if one at least of the logic itineraries declares it (unless, for the sake of redundancy, several out of the possible itineraries are desired to detect the switch). By way of example, the "lower landing gear" parameter may be involved in such a logic sequence. However, in order to guard against omitting to lower this gear, it will be necessary for some other logic sequence not involving the position of the gear to be able to lead to the desired check.

The more or less fine partitioning of the operation into phases depends on the uses to which the identifications of phases are to be put for a specified airplane. The partitioning presented below by way of example is therefore not the only possible one.

Likewise, the detailed definition of the tests depends on the airplane by reason of its configuration (type of engines, existence or absence of movable slats, etc.) and its relevant parameters. The critical values of the numerical or logic variables also depend on the type of airplane.

In the case of a transport airplane, operation is generally partitioned into about ten phases. By way of example, a partitioning into ten phases may be considered, corresponding respectively to stopped on the ground, slow travelling over the ground, fast travelling over the ground (take-off), initial climb, climb, cruising flight or holding level, descent, initial approach, final approach and overshoot.

Among the characteristic switch parameters may be used, in particular, the switching of the engines from stopped to running and vice versa, the changing of engine speed, the crossing of speed thresholds in relation to the travelling over the ground speed, the switching of the landing gear from the compressed state to the relieved state and vice versa, the changing of sign of the vertical speed, the crossing of thresholds in relation to the vertical speed, the crossing of thresholds in relation to the altitude, the changing of sign of the variation in altitude and the crossing of thresholds in relation to the variation in altitude. These various thresholds may be mathematical functions of certain operating or flight parameters.

Furthermore, certain of the relevant parameters, as for example speed or altitude, exhibit a relatively straightforward long-term movement, but a more or less erratic momentary movement. Consequently, control of the crossing of predefined thresholds by these parameters often requires that they be previously smoothed by way of appropriate time constants.

It will be noted that the state of the engines, the speed of the engines, the travelling over the ground speed, the vertical speed, the altitude, the variation in altitude, etc., constitute information available on board an airplane and delivered by sensors or computers which generally exist on board. The compressed or relieved state of the landing gear can be detected by a sensor consisting of a simple interrupter. The same is true for other information, such as the deployment or retraction of aerodynamic surfaces, such as high-lift slats and flaps, as well as the .deployment or retraction of a thrust reverser. Thus, the switching of these aerodynamic surfaces and the thrust reverser from deployment to retraction and vice versa can also be used as phase switch parameter.

For the implementation of the process according to the present invention, there are therefore advantageously provided a device including a set of sensors delivering information whose change of state or of value is representative of the said switches between phases and a computer receiving the information from the said set of sensors, knowing the reference phase, and containing in memory thresholds, and possibly laws for the movements of these thresholds, for at least some of the said information. This computer therefore carries out the various logic tests mentioned above.

The information received by the computer can originate either from sensors specially installed for the implementation of the process according to the invention, or from sensors or processors existing on board the airplane.

Thus, the said computer, which may be analog or digital or which knows the reference phase, may carry out the appropriate tests in order to detect the said switches of phase. It therefore provides its output with the signals representative of the current phase of operation, the said signals being usable for display purposes or being transmittable to other devices or computers able to utilize them.

It is thus seen that, by virtue of the invention and in the case where the system is an airplane, an onboard device is produced, capable of detecting the present operational flight phase, automatically and even in the presence of the greatest number of crew errors regarded as practically possible.

The figures of the attached drawing will clearly elucidate the manner in which the invention may be embodied. In these figures, identical references denote similar elements.

DETAILED DESCRIPTION OF THE INVENTION

Figure 1:
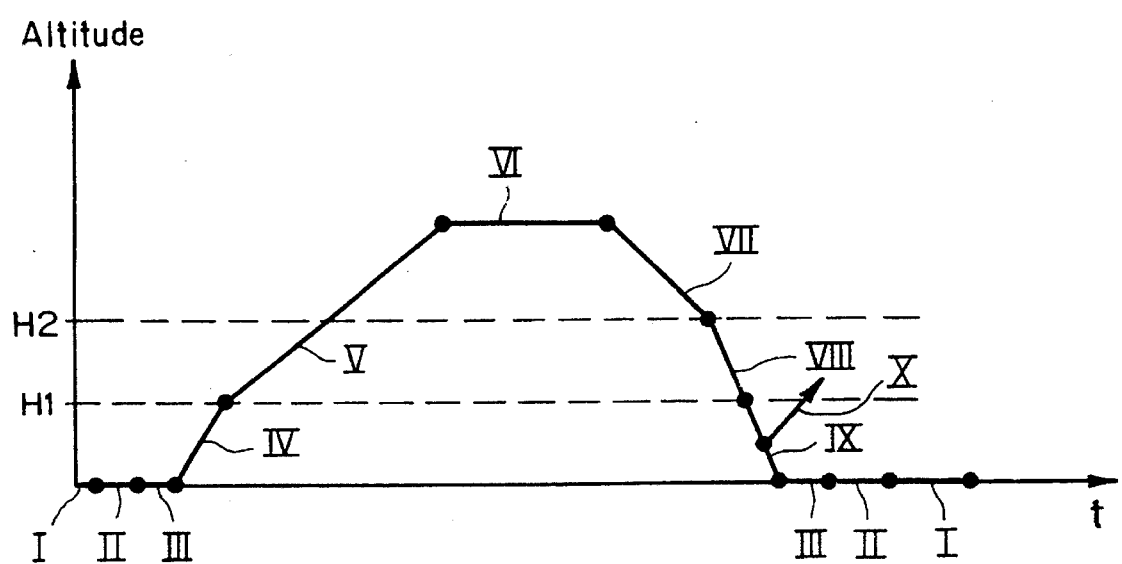
FIG. 1 is a chart illustrating a non-limiting example of the partitioning of the flight of an airplane into phases, the said chart having an abscissa axis recording the time t and an ordinate axis recording the altitude of the said airplane.

The example of the partitioning into phases of the operation of an airplane (not represented), illustrated by FIG. 1, includes the set of the following deliberately chosen phases:

phase I corresponding to stopped on the ground;

phase II corresponding to slow travelling over the ground;

phase III corresponding to fast travelling over the ground, and which also encompasses the take-off run up to actual lift-off (take-off) in addition to post-landing travelling over the ground;

phase IV corresponding to initial climb, immediately following lift-off, the altitude domain of this phase being delimited between the ground and a limit altitude H1;

phase V corresponding to the climb beyond the limit altitude H1;

phase VI corresponding to cruising flight or to level-holding flight;

phase VII corresponding to descent, down to a limit altitude H2 chosen arbitrarily greater than the limit altitude H1 in this example;

phase VIII corresponding to the initial approach between the limit altitudes H2 and H1;

phase IX corresponding to the final approach between the limit altitude H1 and the ground; and phase X corresponding to overshoot, for example following a missed approach.

Figure 2:
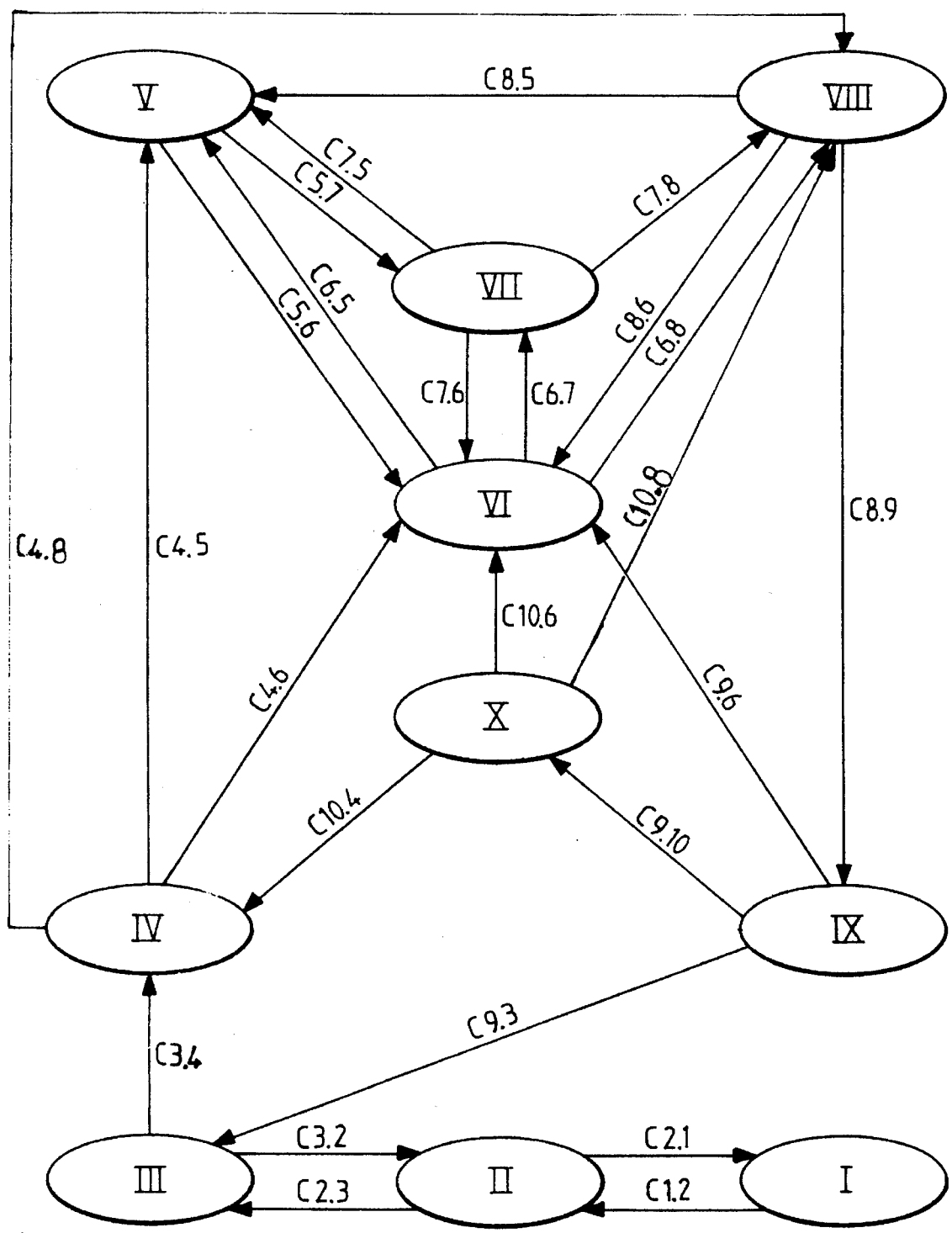
FIG. 2 is a diagram illustrating the various possible switches between the said phases defined in FIG. 1.

Between these ten phases I to X, the only physically possible switches—but which are not necessarily recommendable operationally—are the following (see FIG. 2):

in phase I (stopped on the ground), switch C1.2 over to phase II (slow travelling over the ground);

in phase II (slow travelling over the ground):
  either switch C2.3 over to phase III (take-off);
  or switch C2.1 over to phase I (stopped on the ground), which corresponds to stopping at the destination air terminal or stopping after a manoeuvre on the runway;

in phase III (fast travelling over the ground):
  either switch C3.4 over to phase IV (initial climb after take-off);
  or switch C3.2 over to phase II (slow travelling over the ground), which corresponds to slow travelling over the ground on the airport taxiways or to an acceleration/stop;

in phase IV (initial climb):
  either switch C4.5 over to phase V (climb), for example with a view to attaining a cruising altitude;
  or switch C4.6 over to phase VI (hold) with a view to holding following an interrupted climb procedure;
  or switch C4.8 over to phase VIII (initial approach), with a view to landing;

in phase V (climb):
  either switch C5.6 over to phase VI (cruising or hold);
  or switch C5.7 over to phase VII (descent);

in phase VI (cruising or hold):
  either switch C6.5 over to phase V (climb), corresponding to resuming the climb after a hold;
  or switch C6.7 over to phase VII (descent), corresponding to descent after cruising flight or holding flight;
  or switch C6.8 over to phase VIII (initial approach), corresponding to a landing intention after holding flight;

in phase VII (descent):
  either switch C7.5 over to phase V (climb), which corresponds to resuming a climb following an interrupted descent;
  or switch C7.6 over to phase VI (cruising or hold), which corresponds to resuming cruising or resuming holding after a descent;
  or switch C7.8 over to phase VIII (initial approach), which corresponds to appending a descent to the initial approach;

in phase VIII (initial approach):
  either switch C8.5 over to phase V (climb), which corresponds to resuming the climb after an initial approach;
  or switch C8.6 over to phase VI (hold), which corresponds to interrupting the initial approach with a hold;
  or switch C8.9 over to phase IX (final approach);

in phase IX (final approach):
  either switch C9.3 over to phase III (fast travelling over the ground) in the event of landing;
  or switch C9.6 over to phase VI (hold) with a view to interrupting the final approach with very belated hold;
  or switch C9.10 over to phase X (overshoot) with a view to interrupting the final approach with overshoot;

in phase X (overshoot):
  either switch C10.4 over to phase IV (initial climb), for an initial climb;
  or switch C10.6 over to phase VI (cruising or hold) for overshoot interrupted by levelling-off;
  or switch C10.8 over to phase VIII (initial approach) for overshoot with a view to landing.

When the airplane (not represented) is in phase I stopped on the ground, its engines have stopped or are substantially idling, its speed of travel is zero, its landing gear is lowered and compressed by the weight of the airplane, its thrust reverser is retracted, its brakes are firmly applied, etc.

The switch C1.2 between this phase I stopped on the ground and phase II of slow travelling over the ground can be detected since:

the speed of the engines ceases idling and switches to the speed range used for slow travelling over the ground;

the speed of travel becomes positive, but is less than a threshold Vmin;

the landing gear remains lowered and remains compressed by the weight of the airplane;

the thrust reverser remains retracted;

the brakes are released and can be actuated;

etc.

On the other hand, the switch C2.1 between phase II of slow travelling over the ground and phase I stopped on the ground may be detected by observing that:

the engines switch to ground idling or from running to stopped;

the speed of travel becomes zero;

the landing gear remains lowered and compressed by the weight of the airplane;

the thrust reverser remains retracted;

the brakes are actuated, and then applied;

etc.

The switch C2.3 between phase II of slow travelling over the ground and phase III of fast travelling over the ground corresponds to the run preceding takeoff. It can be characterized by:

the engine speed rises and switches from the range used for slow travelling over the ground to the range required for fast travel;

the speed of travel increases, crosses the threshold Vmin towards the maximum speed of travel Vmax;

the landing gear remains lowered and remains compressed by the weight of the airplane;

the thrust reverser remains retracted;

the brakes are released;

etc.

Conversely, the switch C3.2 between phase III of fast travelling over the ground and phase II of slow travelling over the ground corresponds to the phase of travel immediately following landing or to an acceleration/stop. In this case:

the speed of travel, less than or equal to Vmax, decreases and becomes less Vmin;

the landing gear is lowered and compressed;

the thrust reverser, initially deployed, switches to the retracted position;

the brakes are actuated;

etc.

The switch C3.4 between phase III of fast travelling over the ground and phase IV of initial climb, corresponds to take-off. This switch can be characterized by:

the vertical speed is positive and increases;

the compression of the landing gear diminishes, becoming zero;

the thrust reverser remains retracted;

the brakes are released;

the altitude and the radio-altitude take on increasing values;

etc.

For its part, the switch C4.5 between phase IV of initial climb and phase V of climb can be detected since:

the altitude is increasing and has crossed the threshold H1;

the engine speed is tending towards the speed for climbing;

the landing gear switches from the lowered state to the retracted state;

the high-lift flaps are fully raised;

the pressurization and air-conditioning systems are operating;

etc.

To characterize the switch C4.6 between the initial climb phase IV and the hold phase VI, the following information can be used:

the variation in altitude becomes less than a minimum threshold of altitude variation ALTmin;

the vertical speed becomes less than a minimum threshold for vertical speed Vz min;

the engine speed switches from the nominal speed for initial climb to the speed range corresponding to the holds;

the high-lift flaps are raised;

etc.

The switch C4.8 between the said phase IV of initial climb and phase VIII of initial approach can be defined through the fact that:

the altitude variation becomes negative or zero;

the vertical speed becomes less than the minimum threshold Vz min, and then, possibly, changes sign;

the engine speed switches from the speed for initial climb to the speed for initial approach;

the high-lift flaps switch from the fully retracted state to the deployed state, at least partially;

etc.

Between the climb phase V and the cruising phase VI, the switch C5.6 can be characterized by:

the altitude ceases rising and stabilizes at the cruising altitude;

the vertical speed becomes less than the threshold Vz min;

the altitude variation becomes less than the threshold ΔALTmin;

the engine speed switches from the nominal speed for climb to the range for cruising speeds;

etc.

The information required to characterize the switch C5.7 between phases V (climb) and VII (descent) can be:

the vertical speed, which is less than the minimum threshold Vz min, becomes negative;

the altitude is greater than the threshold H2;

the engine speed switches from the nominal speed for climb to the nominal speed for descent;

the controls for the pressurization and air-conditioning systems are actuated;

etc.

Likewise, the switch C6.5 from the holding phase VI to the climb phase V can be defined by:

the vertical speed becomes greater than the minimum threshold Vz min and is positive;

the altitude is greater than the threshold H1;

the engine speed switches from the holding speed to the climb speed;

etc.

The switch C6.7 between the cruising phase VI and the descent phase VII can be characterized by information analogous to that used for the switch C5.7 and mentioned above, except that the engine speed now switches from the nominal speed for cruising to the nominal speed for descent.

The switch C6.8 between the cruising phase VI and the initial approach phase VIII can be defined by the following information:

the vertical speed becomes negative;

the altitude becomes less than H2, but remains greater than H1;

the high-lift flaps switch from the fully retracted state to the deployed state, at least partially;

etc.

To characterize the switch C7.5 between the descent phase VII and the climb phase V, the fact may be used that, on switching:

the vertical speed becomes positive and greater than the threshold Vz min;

the altitude is greater than H2;

the engine speed switches from the nominal speed for descent to the nominal speed for climb;

etc.

The switch C7.6 from the descent phase VII to the holding phase VI can be defined by:

the altitude variation becomes less than the threshold ΔALTmin;

the altitude remains greater than H2;

etc.

The switch C7.8 from the descent phase VII to the initial approach phase VIII can be characterized by information analogous to that used for the definition of switch C6.8.

The switch C8.5 from the initial approach phase VIII to the climb phase V can be characterized by:

the vertical speed becomes positive and greater than the threshold Vz min;

the engine speed switches from the speed for approach to the speed for climb;

etc.

The switch C8.6 from the initial approach phase VIII to the holding phase VI can be characterized by:

the altitude variation becomes less than the threshold ALTmin;

the altitude is less than H2, but greater than H1;

the high-lift flaps are deployed;

etc.

The switch C8.9 from the initial approach phase VIII to the final approach phase IX can be defined by the fact that:

the altitude (as well as the radio-altitude) becomes less than the threshold H1;

the vertical speed is negative;

the high-lift flaps are lowered;

the landing gear switches from the retracted state to the deployed state;

etc.

The switch C9.3 from the final approach phase IX to the phase III of fast travelling over the ground can be characterized by:

the height with respect to the ground (as well as the radio-altitude) becomes equal to zero;

the landing gear becomes compressed;

the thrust reverser switches from the retracted position to the deployed position;

the engine speed switches to the nominal speed for travelling over the ground;

etc.

The information required for detecting switches C9.6 (from the final approach phase IX to the holding phase VI) and C9.10 (from this phase IX to the overshoot phase X) can be respectively similar to that used to characterize switches C8.6 and C4.5 defined above.

The switch C10.4 from the overshoot phase X to the initial climb phase IV can be detected by the following information:

the vertical speed becomes positive;

the altitude is less than the threshold H1;

the landing gear is raised;

etc.

The switch C10.6 from the overshoot phase X to the holding phase VI can be defined by:

the altitude variation becomes less than the threshold $\Delta ALTmin$;

the switching of the engine speed from the nominal speed for overshoot to the nominal speed for holding;

etc.

The switch C10.8 from the said overshoot phase X to the initial approach phase VIII can be defined essentially by the fact that the altitude is less than the threshold H2 and the vertical speed becomes negative.

It will be noted that, if some other partitioning of the flight phases, finer or coarser than that of the phases I to X mentioned above, were adopted, it would likewise be possible to define a set of physically possible switches between these new phases and to find representative criteria in relation to the new set of switches between phases. Likewise, if a system directly controlled by one or more people were considered instead of a transport airplane, a scheme analogous to that described above would enable various sets of parameters allowing detection of the existence or absence of such or such a switch to be associated with each physically possible phase switch. Programmed in accordance with logic matched to each case, the same type of device could ensure the same sort of functions.

Figure 3:
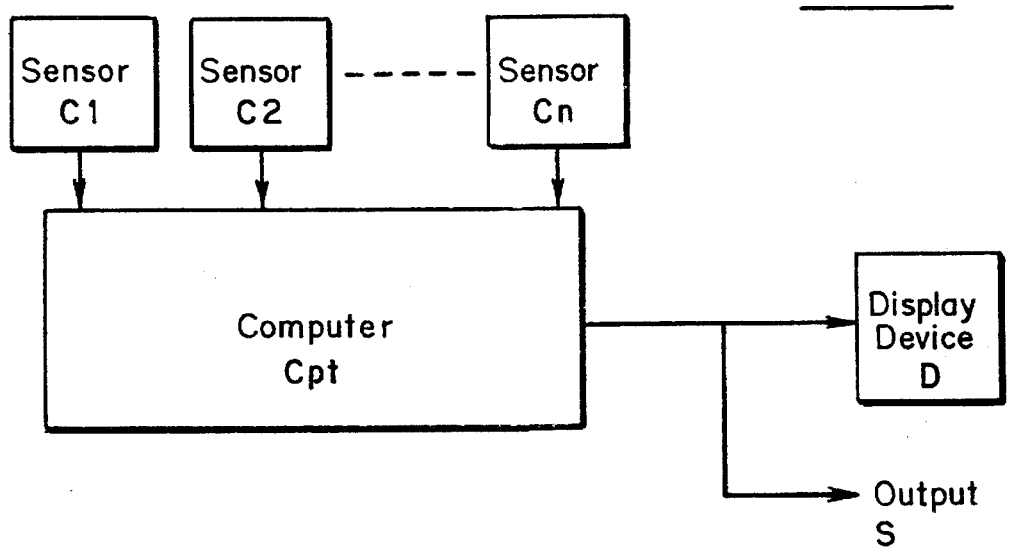
FIG. 3 is the synoptic diagram of a device according to the present invention.

Represented in FIG. 3 is a device in accordance with the invention for implementing the process described above. This device includes:

a set of sensors C1 to Cn delivering information (altitude, altitude variation, speed of travelling over the ground, vertical speed, engine speed, etc.) whose change of state or of value is representative of the switches between phases C1.2, C2.1, . . . , C10.8; and a computer Cpt, which receives the information from the sensors C1 to Cn, which knows the reference phase I, and which contains in memory the thresholds H1, H2, Vmin, Vmax, $\Delta ALTmin$, Vz min, etc.

It will be understood that, by following the procedures described above, the computer Cpt can carry out the appropriate tests to determine all the phase switches C1.2 to C10.8 and deliver at its output S signals representative of the current flight phase, which can be displayed on the display device D and/or transmitted to other user devices (not represented).

In the event of a fault leading to the momentary stoppage of the computer Cpt, for example by reason of an electrical supply failure, the computer can be turned back on in such a way that it simultaneously receives a complementary item of information on the current flight phase, this information item being provided either automatically by the airplane under the control of the pilots, or manually. In the latter case, the flight phase, starting from which the computer can compute normally, can, for example, be indicated by a selector (or numbered buttons) which have as many positions as there are flight phases and which has been activated. If this selector is not activated, the computer is initialized by default to phase I, which corresponds to normal start-up on the ground.

We claim:

1. A process for detecting the current phase of a multi-phase operation of an aircraft, comprising the steps of:

partitioning said operation into a set of phases, so that each phase corresponds to a partial domain of said operation, and so that said set of phases covers the whole of said operation;

choosing a reference phase among said phases;

determining for each phase, the set of possible transitions to the other phases;

defining for each of said transitions, a set of variable parameters characteristic of each of said transitions;

continuously detecting said sets of variable parameters during said multi-phase operation;

continuously detecting variations in said variable parameters;

using said variations in said sets of variable parameters, determining the chain of transitions actually carried out relative to said reference phase; and deducing said current phase of operation from said determined chain of transitions.

2. The process as claimed in claim 1, wherein said set of phases includes a phase wherein said aircraft is stopped on the ground and said reference phase is chosen as being the stopped on the ground phase.

3. The process as claimed in claim 1, wherein said operation is partitioned into ten phases (I to X) corresponding, respectively, to stopped on the ground (I), slow travelling over the ground (II), fast travelling over the ground (III), initial climb (IV), climb (V), cruising flight or holding level (VI), descent (VII), initial approach (VIII), final approach (IX) and overshoot (X).

4. The process as claimed in claim 3, wherein said sets of variable parameters are: the transitions of the engines from stopped to running and vice versa, the changing of engine speed, the crossing of speed thresholds in relation to the travelling over the ground speed, the transitions of the landing gear from the compressed state to the relieved state and vice versa, the changing of sign of the vertical speed, the crossing of thresholds in relation to the vertical speed, the crossing of thresholds in relation to the altitude, the changing of sign of the variation in altitude and the crossing of thresholds in relation to the variation in altitude.

5. The process as claimed in claim 3, wherein said sets of variable parameters are: the transitions from deployment to retraction and vice versa of aerodynamic surfaces, as well as the transitions from deployment to retraction and vice versa of a thrust reverser.

6. A device for carrying out the process of claim 1, comprising:

memory means for storing said sets of variable parameters characteristic of said transitions;

detection means for continuously detecting said variable parameters and the variations in said variable parameters, during said multi-phase operation; and data processor means using said variations in said variable parameters for determining the chain of transitions actually carried out from said reference phase and deducing said current phase of operation from said chain of transitions.

* * * * *